(12) United States Patent
Takeuchi et al.

(10) Patent No.: US 11,108,036 B2
(45) Date of Patent: Aug. 31, 2021

(54) STABLE ELECTROCHEMICALLY ACTIVE COJUGATE INCLUDING ELECTROCHEMICAL MOIETY COVALENTLY LINKED TO CONDUCTIVE POLYMER AND ELECTROCHEMICAL STORAGE CELL USING THE SAME

(71) Applicant: The Research Foundation for the State University of New York, Albany, NY (US)

(72) Inventors: Kenneth J. Takeuchi, South Setauket, NY (US); Esther S. Takeuchi, South Setauket, NY (US); Amy C. Marschilok, South Setauket, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 288 days.

(21) Appl. No.: 15/034,745

(22) PCT Filed: Oct. 17, 2014

(86) PCT No.: PCT/US2014/061126
§ 371 (c)(1),
(2) Date: May 5, 2016

(87) PCT Pub. No.: WO2015/069439
PCT Pub. Date: May 14, 2015

(65) Prior Publication Data
US 2016/0293938 A1    Oct. 6, 2016

Related U.S. Application Data

(60) Provisional application No. 61/900,546, filed on Nov. 6, 2013.

(51) Int. Cl.
*H01M 4/36* (2006.01)
*H01B 1/12* (2006.01)
(Continued)

(52) U.S. Cl.
CPC .......... *H01M 4/364* (2013.01); *C08G 61/124* (2013.01); *H01B 1/127* (2013.01); *H01M 4/602* (2013.01);
(Continued)

(58) Field of Classification Search
CPC ...... H01M 4/364; H01M 4/602; H01M 4/625; H01B 1/127; C08G 61/124
(Continued)

(56) References Cited

U.S. PATENT DOCUMENTS 4,818,646 A * 4/1989 Takakubo ............ C08G 61/124
                                                    205/76
5,501,922 A    3/1996 Li et al.
(Continued)

FOREIGN PATENT DOCUMENTS

WO      2013045894      4/2013

OTHER PUBLICATIONS

Cosnier et al., A Poly[tris(N-bipyridylylbutyl)pyrrole)ruthenium(II)]-RuO2 Catalytic Modified Electrode for Organic Oxidations, Jul. 1988, Inorganic Chemistry, 27, 2389-2390 (Year: 1988).*
(Continued)

*Primary Examiner* — Sean P Cullen
(74) *Attorney, Agent, or Firm* — Alan M. Sack; John F. Vodopia; Sack IP Law p.c.

(57) ABSTRACT

This invention relates to the field of energy storage devices, and especially electrochemical energy storage devices where an electroactive moiety is chemically attached to a conductive polymer In particular, the invention relates to the design and fabrication of electrodes for the use in electrochemical (Continued)

2A storage devices having an electrochemically active conjugate. The electrochemically active conjugate preferably has an electroactive moiety selected from electroactive metal center, an electroactive organic species, or an electroactive non-metal species. Depending on the selected electroactive moiety, it can be attached either directly or through an appropriate linker to the conductive polymer.

9 Claims, 11 Drawing Sheets

(51) Int. Cl.
    *C08G 61/12*     (2006.01)
    *H01M 10/00*     (2006.01)
    *H01M 4/60*     (2006.01)
    *H01M 4/62*     (2006.01)
    *H01M 10/0525*     (2010.01)

(52) U.S. Cl.
    CPC ....... *H01M 10/00* (2013.01); *H01M 10/0525* (2013.01); *C08G 2261/1526* (2013.01); *C08G 2261/1529* (2013.01); *C08G 2261/3221* (2013.01); *C08G 2261/514* (2013.01)

(58) Field of Classification Search
    USPC .......................................... 429/213
    See application file for complete search history.

(56) References Cited

U.S. PATENT DOCUMENTS

| | | | |
|---|---|---|---|
| 6,869,729 B1* | 3/2005 | Pope | C08G 61/12 429/213 |
| 2007/0082267 A1* | 4/2007 | Goodenough | H01M 4/131 429/231.1 |
| 2008/0057420 A1 | 3/2008 | Inagaki et al. | |
| 2013/0148413 A1 | 6/2013 | Van Der Boom et al. | |

OTHER PUBLICATIONS

Saint-Aman et al., Investigation of electrochemical reversibility and redox-active polypyrrole film formation of amide ferrocene-pyrrole derivatives, 1997, Electrochmica Acta, 42, 1829-1837 (Year: 1997).*
Eaves et al., Electroactive Thin Films from the Anodic Electropolymerisation of Iron(II) and Ruthenium)II) Tris(N-bipyridylpyrrole) Complexes, Journal of the Chemical Society, Chemical Communications, 1985, 684-685 (Year: 1985).*
Guadalupe et al., Oxo Complexes, pH Effects, and Catalysis in Films Formed by Electropolymerization, 1993, Inorganic Chemistry, 32, 5502-5512 (Year: 1993).*
Eaves et al., Anodic Electrodeposition of Thin Films of Polypyrrole Functionlized with Metal Bipyridyl Redox Centers, 1987, Inorganic Chemistry, 26, 644-650 (Year: 1987).*
Naji et al., Preparation of Membranes by Electropolymerization of Pyrrole Functionalized by a Ferrocene Group, 2004, Journal of Applied Polymer Science, 91, 3947-3958 (Year: 2004).*
Foster et al., Synthesis, Characterization and Electrochemical Polymerization of Ru2p Functionalized Pyrrole Monomer, 2007, Electroanalysis, 19, 1509-1517 (Year: 2007).*
Deronzier et al., Photoredox pathways for the polymerization of a pyrrole-substituted ruthenium tris(bipyridyl) complex, 1998, New Journal of Chemistry, 22, 33-37 (Year: 1998).*
Rodríquez et al., Redox and catalytic properties of new polypyrrole modified electrodes functionalized by [Ru(bpea)(bpy)H2O]2+ complexes, 2003, Electrochimica Acta, 48, 1047-1054 (Year: 2003).*
Dakkach et al., Polypyrrole-functionalized ruthenium carbene catalyst as efficient heterogeneous systems for olefin epoxidation, 2014, Dalton Transactions, 43, 9916-9923 (Year: 2014).*
Lopez et al., Electrochemical recognition of chloride ions by a poly [tris-(2,2'-bipyridine)ruthenium(II)] modified electrode, 1996, Journal of the Chemical Society, Faraday Transactions, 92, 1527-1532 (Year: 1996).*
Messier, R.W. The essence of materials for engineers, 2010, Jones & Bartlett Publishers, p. 32 (Year: 2010).*
Ma et al., Electrogenerated chemiluminescence aptasensor for thrombin incorporating poly(pyrrole-co-pyrrole propylic acid) nanoparticles loaded with aptamer and ruthenium complex, 2011, Science China Chemistry, 54, 1357-1364 (Year: 2011).*
Wikipedia contributors. "Amide." Wikipedia, The Free Encyclopedia. Wikipedia, The Free Encyclopedia, Dec. 20, 2020. Web. Dec. 28, 2020. (Year: 2020).*
Wikipedia contributors. "N-Hydroxysuccinimide." Wikipedia, The Free Encyclopedia. Wikipedia, The Free Encyclopedia, Jun. 25, 2020. Web. Dec. 28, 2020. (Year: 2020).*
Wikipedia contributors. "1-Ethyl-3-(3-dimethylaminopropyl)carbodiimide." Wikipedia, The Free Encyclopedia. Wikipedia, The Free Encyclopedia, Jul. 16, 2020. Web. Dec. 28, 2020. (Year: 2020).*
Saunders et al., "Physical and Spectroscopic Studies of Polypyrrole Films Containing Transition-Metal EDTA Chelates," Chemistry of Materials, vol. 6, No. 5, pp. 697-706, 1994.
Liu et al., Synthesis, characterization and some properties of amide-linked porphyrin—ruthenium(II) tris(bipyridine) complexes, Tetrahedron, vol. 61, Issue 23, Jun. 6, 2005, pp. 5655-5662, ISSN 0040-4020, http://dx.doi.org/10.1016/j.tet.2005.03.060.

* cited by examiner

FIG. 2B $L^2$ = bidentate ligand
$L^3$ = tridentate ligand
M = metal center

STABLE ELECTROCHEMICALLY ACTIVE COJUGATE INCLUDING ELECTROCHEMICAL MOIETY COVALENTLY LINKED TO CONDUCTIVE POLYMER AND ELECTROCHEMICAL STORAGE CELL USING THE SAME

FIELD OF THE INVENTION

This invention relates to the field of energy storage devices, and especially electrochemical energy storage devices where an electroactive moiety is chemically attached to a conductive polymer. In particular, the invention relates to the design and synthesis of electrodes for the use in the electrochemical storage devices having an electroactive metal center, an electroactive organic species, or an electroactive non-metal species chemically attached to a conductive polymer. The selection of the conductive polymer, the electroactive moiety, and how two are linked will determine whether the electrochemical assembly functions as an anode or a cathode. The design of such electrodes leads to a highly stable, robust, and resilient systems.

BACKGROUND

Most of the recent research and commercial development of batteries has focused on materials that are primarily suitable for use m portable electronics or to vehicle propulsion, where the amount of energy storage per unit weight or volume is typically the critical issue. Such batteries primarily rely on the reversible insertion of lithium ions, for example, by using the inorganic transition metal-oxide materials. Although these batteries demonstrate high capacity, they suffer from number of disadvantages, such as inability to withstand rapid charge response, loss of capacity after to long charge/discharge cycling, and prohibitive costs for large scale energy storage.

One prominent example that addresses the above-noted disadvantages is the use of organic materials for intercalation of lithium ions. Such materials include carbon nanotubes, conducting polymers (CPs), nonconjugated radical polymers, organosulfur polymers, nitroxide radical tetramethylpiperidine-N-oxyl (TEMPO)-based polymers, pendant-type polymer based on ferrocene and carbazole, aromatic carbonyl derivatives, quinine-based materials, and combinations of such materials. Such materials are attractive for their ease of preparation and high energy density, as well as a possibility for the design of any size and shape of electrode films for flexible Li-ion batteries.

Among, these organic materials, conducting polymers were suggested to be most probable candidates for their high electronic conductivity and reversible redox-active chemistry, in particular, p-doped polymers, such as polyaniline (pAn), polypyrrole (pPy), polythiophene (pTh), and their derivatives. These polymers can be charged and discharged by a redox reaction, which is accompanied by inserting/de-inserting, both lithium ions and counter anions in the electrolyte. Among the conducting polymers, pPy is one of the most popular for use as a cathode, because of its environmental stability, high specific energy that ranges from 80 to 390 Wh $kg^{-1}$ and theoretical capacity of about 400 mAh $g^{-1}$. For example, Su et al. (*Electrochimica Acta* 104, 2013, 302-307; incorporated by reference in its entirety) proposed a novel ferrocene-contained pPy derivative prepared by chemical oxidation polymerization and used as cathode materials of lithium ion batteries. The effects of ferrocene moiety on the performance of the pPy based batteries showed improved discharge voltage and charge/discharge performance compared to the pristine pPy electrodes. However, the ferrocene-contained pPy derivatives prepared by Su et al. are typically less stable and susceptible to degradation because the utilized ester linkage between the ferrocene and pPy can be easily displaced by other nucleophiles.

Sen et al. (*ACS Appl. Mater. Interfaces* 160(5), 2013, A3020-A3025; incorporated by reference in its entirety), on the other hand, proposed a design of electrodes having pPy polymer doped with viologens that are either electrostatically or covalently bound directly to the pPy monomers. The resulting batteries with viologen dopants exhibited the charge/discharge behavior with a maximum capacity of 55 mAh/g at a discharge current of 0.25 $mM/cm^2$. The viologen linked to the pPy monomers prepared by synthesis route disclosed in Sen et al. using alkyl linkages have limited synthetic versatility. They are also susceptible to degradation.

In general, the electrodes so far prepared using such polymers have several shortcomings relating to their generally low realizable capacity due to the low doping degree and the sloping charge-discharge curves due to the nature of doping process. Additionally, these electrodes exhibit relatively poor stability and polymer degradation. These problems have limited the practical applications of conducting polymers, e.g. pPy, in energy storage devices. Thus, despite the availability of polymer based electrodes, there is still a need for electrodes that overcomes the shortcomings of the electrochemical storage systems disclosed in the prior art.

SUMMARY

In view of the above-described problems, needs, and goals, novel electrochemically active conjugates that have utility in electrochemical storage devices, such as batteries and supercapacitors, are provided. The disclosed invention further encompasses electrodes, either cathodes or anodes, composed of the electrochemically active conjugates and preferably combined with a conductive additive, such as a conductive carbon, and a binder. Such electrodes improve the performance, including enhanced power, high reversibility, high efficiency, and virtually complete utilization of the electrochemically active moieties during charge/discharge cycling of electrochemical energy storage devices.

Generally, the disclosed electrochemically active conjugates have an electrochemical moiety, which can be reduced and/or oxidized covalently linked to a conductive polymer. The covalently bound electroactive moiety maintains electrical contact to the electrode since it is an intimate part of the conductive polymer. Thus, it is contemplated that every electrochemically active center within the disclosed electrode can be accessed as they all have electrical contact: with the conductive polymer and current collector. The achievable capacity of the disclosed system is anticipated to be close to the theoretical capacity. In contrast, the achievable capacity is significantly lower than the theoretical capacity in presently used solid composite battery electrodes because many active centers do not participate in the electrochemistry due to insufficient porosity and the inherent lack of conductivity of the composite components.

In one embodiment, the electroactive moiety is covalently bonded to a conductive polymer, where the electroactive moiety is an electroactive metal center bound to a ligand system, preferably, a multidentate ligand. In another embodiment, the electroactive moiety is an electroactive organic center/species; or a non-metal center/species that have multiple accessible valance states. In a preferred embodiment the electroactive moiety is covalently bonded to a conductive polymer through a ligand that forms an amide bond between the electroactive moiety and the conductive polymer.

The disclosed invention further encompasses an electrode, either an anode or a cathode depending on the selection of the conductive polymer, the electroactive moiety, and the ligand system. In one embodiment, the electrode is preferably composed of the electrochemically active conjugate(s) manufactured in accordance with the disclosed method combined with a conductive additive, such as a conductive carbon, and a binder.

The disclosed invention further encompasses an electrochemical cell, for example, a battery or a capacitor, having a cathode, an anode, and an electrolyte. In a preferred embodiment, the electrochemical cell is a battery having a cathode composed of an electrochemically active conjugate manufactured in accordance with the disclosed method. In another preferred embodiment, the electrochemical cell is a battery having an anode composed of an electrochemically active conjugate manufactured in accordance with the disclosed method. In yet another preferred embodiment, the electrochemical cell is a battery having a cathode and an anode composed of an electrochemically active conjugate manufactured in accordance with the disclosed method.

These and other characteristics of the electrochemically active conjugate) and the method of synthesis will become more apparent from the following description and illustrative embodiments which are described in detail with reference to the accompanying drawings. Similar elements M each figure are designated by like reference numbers and, hence, subsequent detailed descriptions thereof may be omitted for brevity.

DETAILED DESCRIPTION

The disclosed invention provides a new electrochemically active conjugate that can be used within a cathode and/or an anode of an electrochemical storage system. The type of electrochemical storage system is not particularly limited, as long as it can function as a battery or as a supercapacitor. Such electrochemical storage systems have improved performance, including enhanced power, high reversibility, high efficiency, and virtually complete utilization of the electrochemically active moieties during charge/discharge cycling.

Generally, the disclosed electrochemically active conjugates have an electrochemical moiety, that can be reduced and/or oxidized, covalently linked to a conductive polymer. The covalently bound electroactive moiety maintains electrical contact to the electrode since it is an intimate part of the conductive polymer. Thus, it is contemplated that every electrochemically active center within the disclosed electrode can be accessed as they all have electrical contact with the conductive polymer and current collector. The achievable capacity of the disclosed system is anticipated to be close to the theoretical capacity. In contrast, the achievable capacity is significantly lower than the theoretical capacity in the solid composite battery electrodes because many active centers do not participate in the electrochemistry due to insufficient porosity and the inherent lack of conductivity of the composite components.

Without being bound by theory, the disclosed conjugates retain the physical properties of the conductive polymer, including flexibility. Due to its flexibility, the electroactive material does not suffer from mechanical failure, typically observed in solid composite battery electrodes where cracking, splitting or change of interlayer spacing can take place as a result of electron and on transfer. Any physical changes in the conjugate which occur during an oxidation, a reduction, or repeated reduction and oxidation of the electroactive moiety does not result in separation of the electroactive moiety from the conductive polymer.

Figure 1:
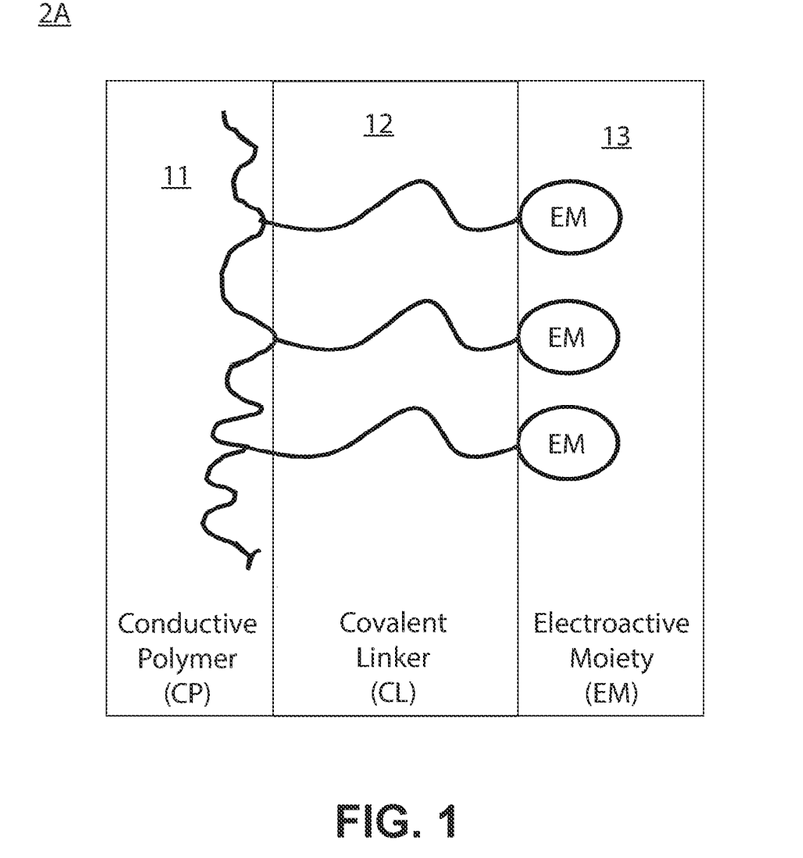
FIG. 1 shows schematic illustration of the transition metal based electroactive moiety covalently bonded to a conductive polymer via, a ligand system (linker).
Figures 2A, 2B:
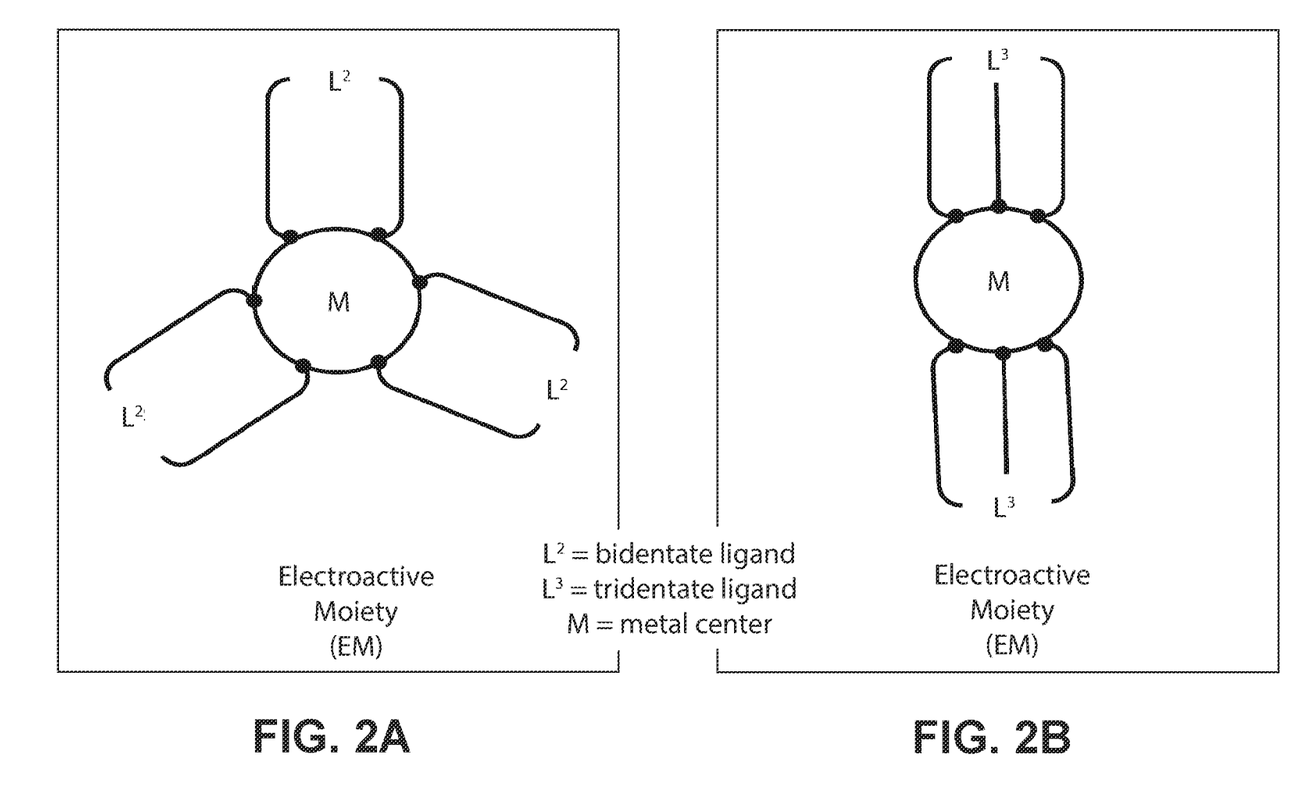
FIG. 2A shows a schematic illustration of the electroactive moiety laving a metal center covalently bonded to a bidentate ligand linker.
FIG. 2B shows a schematic illustration of the electroactive moiety having a metal center covalently bonded to a tridentate ligand linker.
Figure 3:
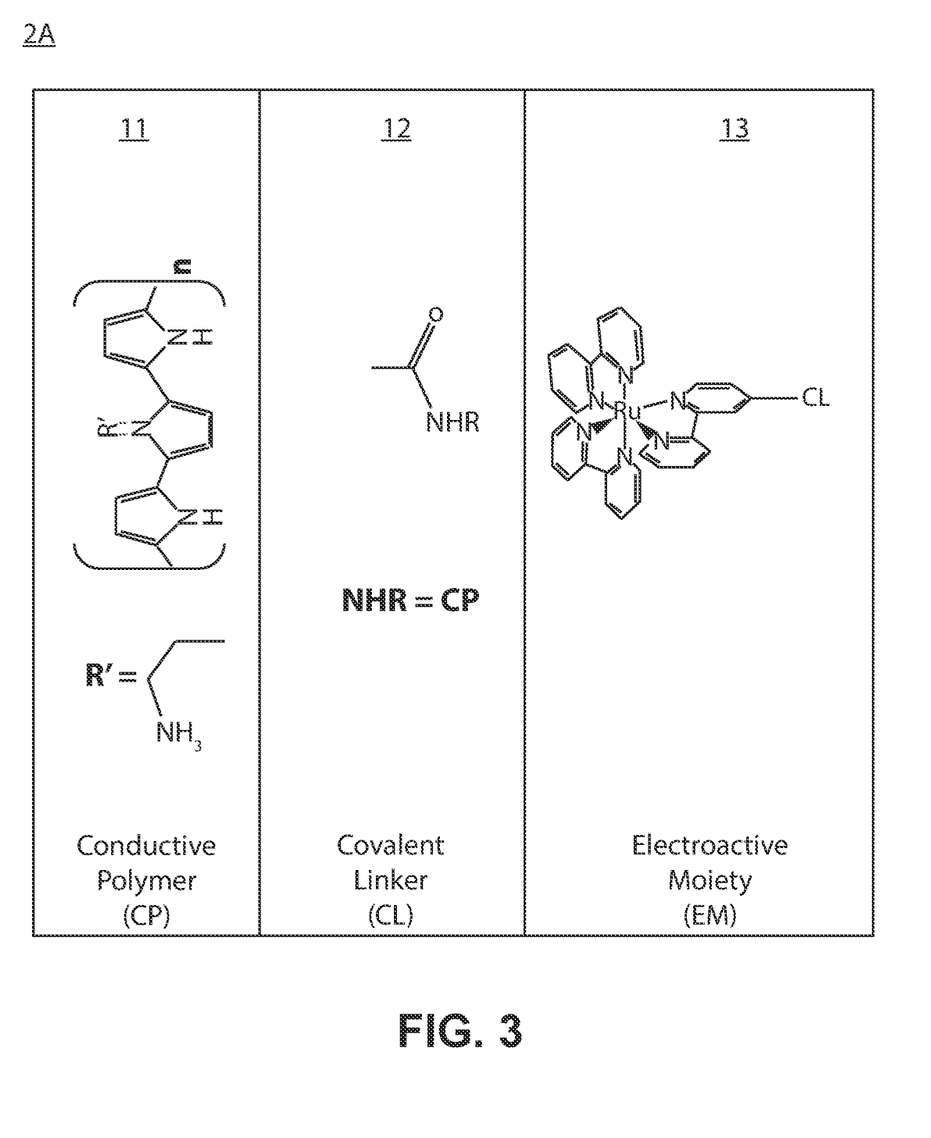
FIG. 3 shows the exemplar elements/components of the electrochemically active conjugate: (1) polypyrrole (pPy); (2) ligand that forms an amide linkage; and (3) ruthenium bipyridine complex.

In one embodiment, the electroactive moiety is covalently bonded to a conductive polymer, where the electroactive moiety is an electroactive metal center bound to a ligand system, preferably a multidentate ligand. FIG. 1 illustrates an exemplary embodiment of such conjugate 2A having three key building blocks: (1) the electroactive metal center 13, (2) the conductive polymer 11, and (3) the multidentate ligand 12. Denticity refers to the number of times a ligand bonds to a metal through non-contiguous donor sites. Many ligands are capable of binding metal centers through multiple sites. Thus, a ligand that binds through two sites is classified as bidentate, whereas the ligand that binds through three sites is classified as tridentate. In one exemplary embodiment, the multidentate ligand is a bidentate ligand as illustrated in FIG. 2A. In another exemplary embodiment, the multidentate ligand is a tridentate ligand as illustrated in FIG. 2B. In these embodiments, the multidentate ligand binds the active metal center to the conductive polymer. While one portion of the ligand binds to the metal center, another portion binds to the conductive polymer. In a preferred embodiment the ligand forms a covalent bond with the conductive polymer that is stable in the acidic environment of the electrochemical cell. In a more preferred embodiment, the covalent bond is an amide bond. FIG. 3 illustrates an exemplary embodiment of such conjugate 2A where the three key building blocks are: (1) ruthenium metal center; (2) linked to polypyrrole conductive polymer (11) bipyridine complex (13) via a functionalized bipyridine through an ethyl-amide linker (12). FIG. 4B illustrates the conjugate of FIG. 3 electrodeposited as a film on the conductive carbon 10.

The conductive polymer in the conjugate illustrated in FIG. 1 can be selected from the group of polypyrrole, polyaniline, polyacetylene, polyparaphenylene, polyparaphenylene sulfide, polyparaphenylenevinylene, polythiophene, polyisothionapthene, and combinations of these polymers. Although, the above disclosed, conductive polymers are not functionalized, the conductive polymers may also be functionalized to form, for example, methylpolypyrrole, ethylpolypyrrole, and others functionalized conductive polymers. Copolymers consisting of combinations of functionalized and nonfunctionalized polymers and/or different polymer types are also contemplated to be within the scope of the disclosed invention. It is also contemplated that other heteroatom containing conductive polymers may be used in the fabrication of the disclosed electrode. While the conductive polymer within such electrodes provides a conductive pathway, it also may contribute to an enhanced capacity of the system. FIG. 3 illustrates an exemplary embodiment where the conductive polymer is polypyrrole.

The electroactive metal center can be a transition metal such as, but not limited to, iron (Fe), ruthenium (Ru), rhodium (Rh), cobalt (Co), manganese (Mn), nickel (Ni), vanadium (V), palladium (Pd), silver (Ag), platinum (Pt), osmium (Os), aluminum (Al), titanium (Ti), magnesium (Mg), zinc (Zn), copper (Cu), and rhenium (Re). In a preferred embodiment, the electroactive mental centers are selected that have multiple accessible valance states and can provide multiple electron transfers, such as iron (Fe), manganese (Mn), ruthenium (Ru), and zinc (Zn). FIG. 3 illustrates an exemplary embodiment, where the electroactive metal center is ruthenium (Ru) metal.

The multidentate ligand linker may be based on structures where the coordinating atoms are one or more of the following: nitrogen, carbon, oxygen, sulfur, and phosphorous. Preferred multidemate ligand linkers include terpyridine, ethylenediaminetetraacetate (EDTA), bipyridine, porphyrin, phthalocyanine, pyrazole, pyridine, and phosphine, in this embodiment, the multidentate ligand binds to the electroactive metal center, forming an electroactive moiety. FIG. 3 illustrates an exemplary embodiment of the conjugate having the electroactive center or moiety with a bipyridine ring system coordinated, to a ruthenium (Ru) metal center.

In another embodiment, the electroactive moiety is a non-metal electroactive organic center/species that preferably can provide multiple electron transfer due to multiple accessible valance states. In this embodiment, the electroactive organic species can be selected from dialkoxyaryl (e.g., 1,2-, 1,3-, or 1,4-dialkoxyaryl such as 1,2-dimethoxybenzene) or trialkoxyaryl (e.g., 1,2,3-, 1,2,4-, 1,3,5-trialkoxyaryl, such as 1,2,3-trimethoxybenzene). It should be understood that this list is not exhaustive and that these can be used in various and numerous combinations and embodiments.

The conductive polymer in this embodiment can be selected from the group of polypyrrole, polyaniline, polyacetylene, polyparaphenylene, polyparaphenylene sulfide, polyparaphenylenevinylene, polythiophene, polyisothionapthene, and combinations of these polymers. It is also contemplated that other heteroatom containing conductive polymers may be used in the fabrication of the disclosed electrode linked to the conductive polymer.

The disclosed invention further encompasses an electrode. Both anodes and cathodes can be designed in this manner and depend on the selection of the conductive polymer, the electroactive moiety, and the ligand system. In one embodiment, the electrode is preferably composed of the electrochemically active conjugate(s) manufactured in accordance with the disclosed method combined with a conductive additive, such as a conductive carbon, and a binder. In a preferred embodiment, the composition of the electrochemically active conjugate, additive, and binder is about 40% to 90% of the electrochemically active conjugate, 10% to 50% of additive, and 5% to 25% of binder. In a more preferred embodiment the composition of the electrochemically active conjugate, additive, and binder is about 55:30:15.

The disclosed invention further encompasses an electrochemical cell, e.g., a battery or capacitor, having a cathode, an anode, and an electrolyte. In a preferred embodiment, the electrochemical cell is a battery having a cathode composed of an electrochemically active conjugate manufactured in accordance with the disclosed method. In another preferred embodiment, the electrochemical cell is a battery having an anode composed of an electrochemically active conjugate manufactured in accordance with the disclosed method. In yet another preferred embodiment, the electrochemical cell is a battery having a cathode and an anode composed of an electrochemically active conjugate manufactured in accordance with the disclosed method.

Figure 5:
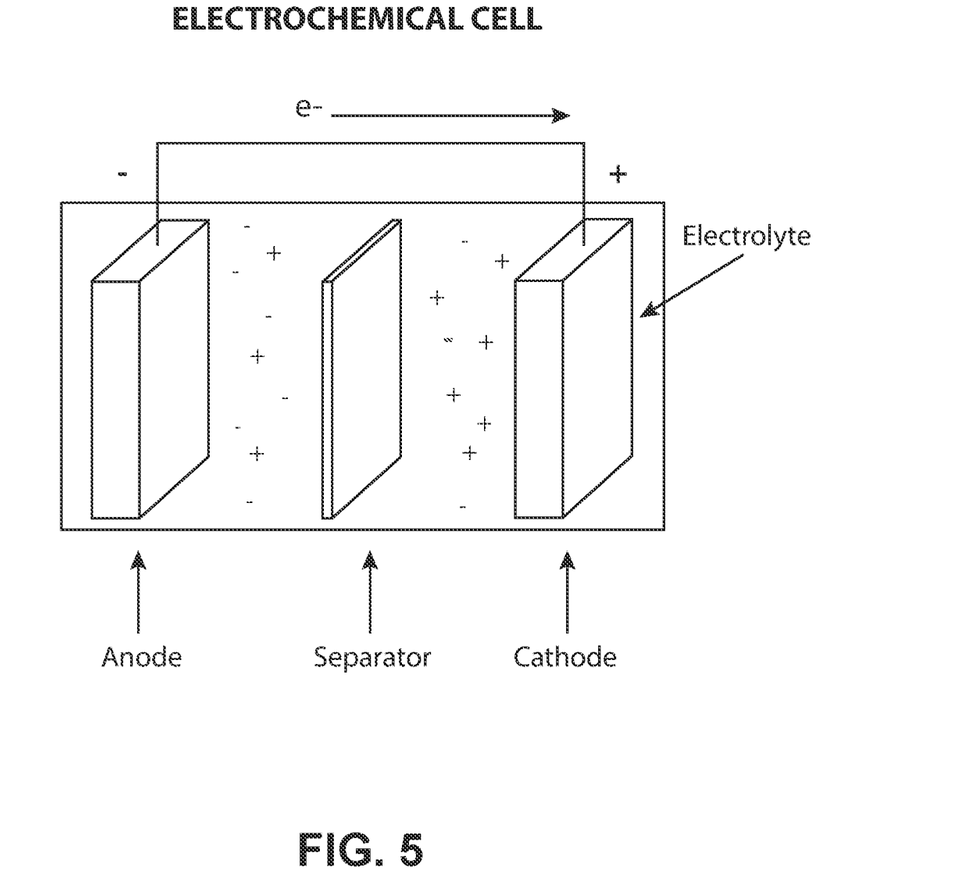
FIG. 5 is a schematic inns ration of a generalized electrochemical cell incorporating the disclosed polymer based electrode with electrochemically active conjugates.

As with most batteries, the electrochemical cell has an outer case made of metal or other material(s) or composite(s). The electrochemical cell is preferably a non-aqueous battery. The case holds a positive electrode (cathode), a negative electrode (anode), a separator, and an electrolyte as shown in FIG. 5. The separator is a very thin sheet of microperforated plastic, however, other materials may suitably be used to separate the positive and negative electrodes while allowing ions to pass through. The anode is generally made from the electrochemically active conjugate(s) such as Fe(EDTA) - - - PPy or Ru[bpy]$_2$ [bpyCONH]$^{+2}$ - - - PPy, on carbon support to produce charge carriers in a polymer-based battery anode, prepared or synthesized in accordance with the disclosed, process. The cathode is also generally made from the electrochemically active conjugate(s), prepared or synthesized in accordance with the disclosed process. However, in some embodiments, only one of the electrodes has the electrochemically active conjugate(s), whereas the other counter electrode can be made from components known in the art.

In one exemplary embodiment, the electrochemical cell is Li-ion battery. In such battery, both the anode and cathode are materials into which and from which lithium can migrate. When the battery charges, ions of lithium move through the electrolyte from the positive electrode to the negative electrode and attach to the carbon. During discharge, the lithium ions move back to the cathode from the anode. Inside the case, the electrodes are submerged in an organic solvent that acts as the electrolyte. The electrolyte is composed of one or more lithium salts, one or more solvents and one or more anion receptors/additives.

For example, the cathode may include one or more lithium metal oxide compound(s) (Li-MMO). Lithium mixed metal oxides contain at least one other metal selected from the group consisting of Mn Co, Cr, Fe Ni, V, and combinations thereof. For example the following lithium MMOs may be used in the cathode: $LiMnO_2$, $LiMn_2O_4$, $LiCoO_2$, $Li_2Cr_2O_7$, $Li_2CrO_4$, $LiNiO_2$, $LiFeO_2$, $LiNiCo_{1-x}O_2$ (O<x<1), $LiMn_zNi_{1-z}O_2$ (0<z<1; $LiMn_{0.5}Ni_{0.5}O_2$), $LiMn_{0.33}Co_{0.33}Ni_{0.33}O_2$, $LiMc_{0.5}Mn_{1.5}O_4$, where Mc is a divalent metal: and $LiNi_xCo_yMe_zO_2$ where Me may be one or more of Al, Mg, Ti, B, Ga, and Si and 0<x, y, z<1. Furthermore, transition metal oxides such as $MnO_2$ and $V_2O_5$; transition metal sulfides such as $FeS_2$, $MoS_2$, and $TiS_2$; and conducting polymers such as polyaniline and polypyrrole may be present.

The cathode may further comprise a conductive additive. In a preferred embodiment, the conductive additive may be a conducting carbon, such as carbon black, (e.g., Super P® (Timcal, Bodio Switzerland)), carbon nanotubes, or acetylene carbon. The cathode may also comprise a polymeric binder. In a preferred embodiment, the binder may be polyvinylidene fluoride, styrene-butadiene rubber, polyamide or melamine resin, and combinations of these binders. In one embodiment, the composition of the electrochemically active conjugate, conducting additive, and binder is about 40% to 90% of the electrochemically active conjugate, 10% to 50% of additive, and 5% to 25% of binder. The preferred composition of the electrochemically active conjugate, additive, and binder is about 55:30:15.

Although the above embodiment has been described with reference to lithium ion-based electrochemical cells, it is also envisioned that the disclosed electrochemically active conjugate(s) can be successfully applied to other electrochemical cells, such as hybrid electrochemical cells (HEC), supercapacitors fuel cells, and other conductors.

While the synthesized electrochemically active conjugate(s) and the structure of the electrochemical cells including electrodes based on such materials have been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

EXAMPLES

The examples set forth below also serve to provide further appreciation of the disclosed invention, but are not meant in any way to restrict the scope of the invention.

Example 1

A preparation of an exemplary electrochemically active conjugate is provided on a conductive carbon surface. Initially, the synthesis of the substituted EDTA conjugate starts with the formation of EDTA dianhydride according to a method reported in Takeshita, T. et al, (*JAOCS*, 1982. 59(2): p. 104-107; incorporated by reference in its entirety) and illustrated in FIG. 8. Specifically, the monoanhydride is formed by addition of a controlled amount of water to a DMF solution of EDTA dianhydride.

Figure 8:
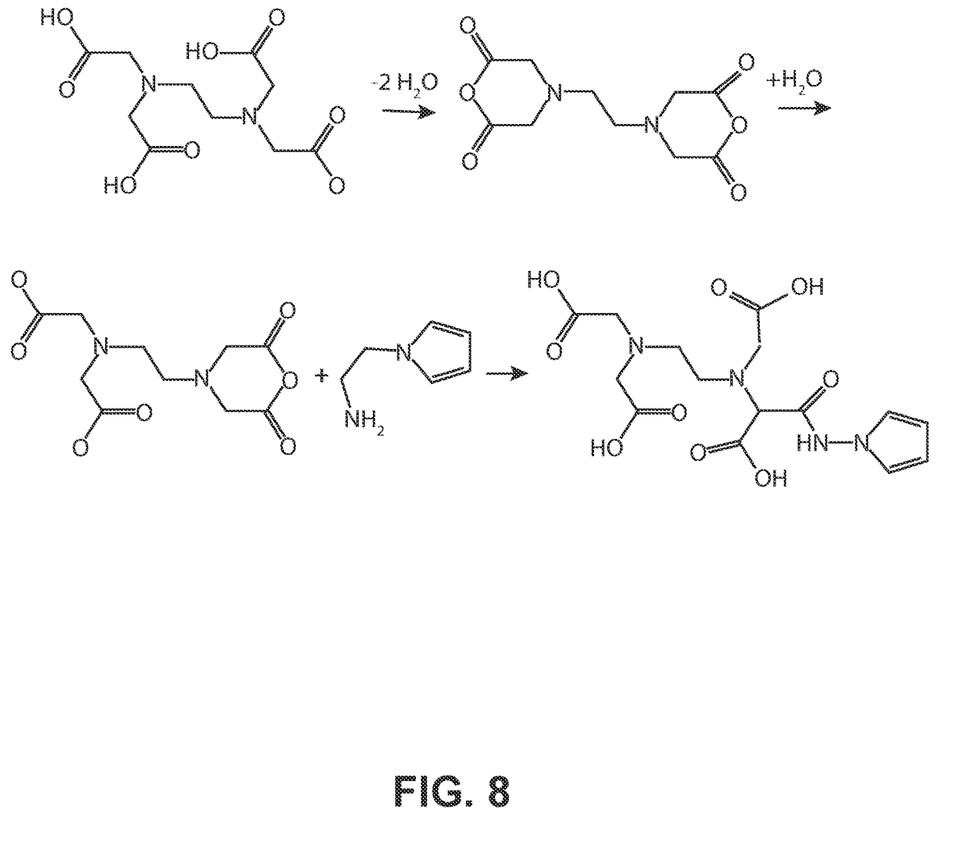
FIG. 8 is a schematic illustration of EDTA-monoalkylamine synthesis.

Reaction of 2-aminoethyl pyrrole with EDTA monoanhydride yields pyrrole substituted EDTA through an amide linkage. The metal chelates is formed spontaneously by mixing EDTA-Py conjugate with iron(III). The formation constant, log $K_f$, for the Fe(III) EDTA complex is about 25 and for Fe(II) it is about 14 (Harris, D. C. Quantitative Chemical Analysis, 2007, New York, N.Y.: W. H. Freemand and Company). Thus, it is believed that the iron should remain coordinated with the EDTA throughout the electrochemical cycling. While the complex in this example is described with reference to Fe(III), manganese can also be used as the metal center with EDTA due to its potential for use in energy storage systems, where like iron it is low cost and earth abundant. The formation constant for Mn(III) EDTA is about 25.2 and for Mn(II) it is about 13.89 again indicating stability of the complex.

Figure 9:
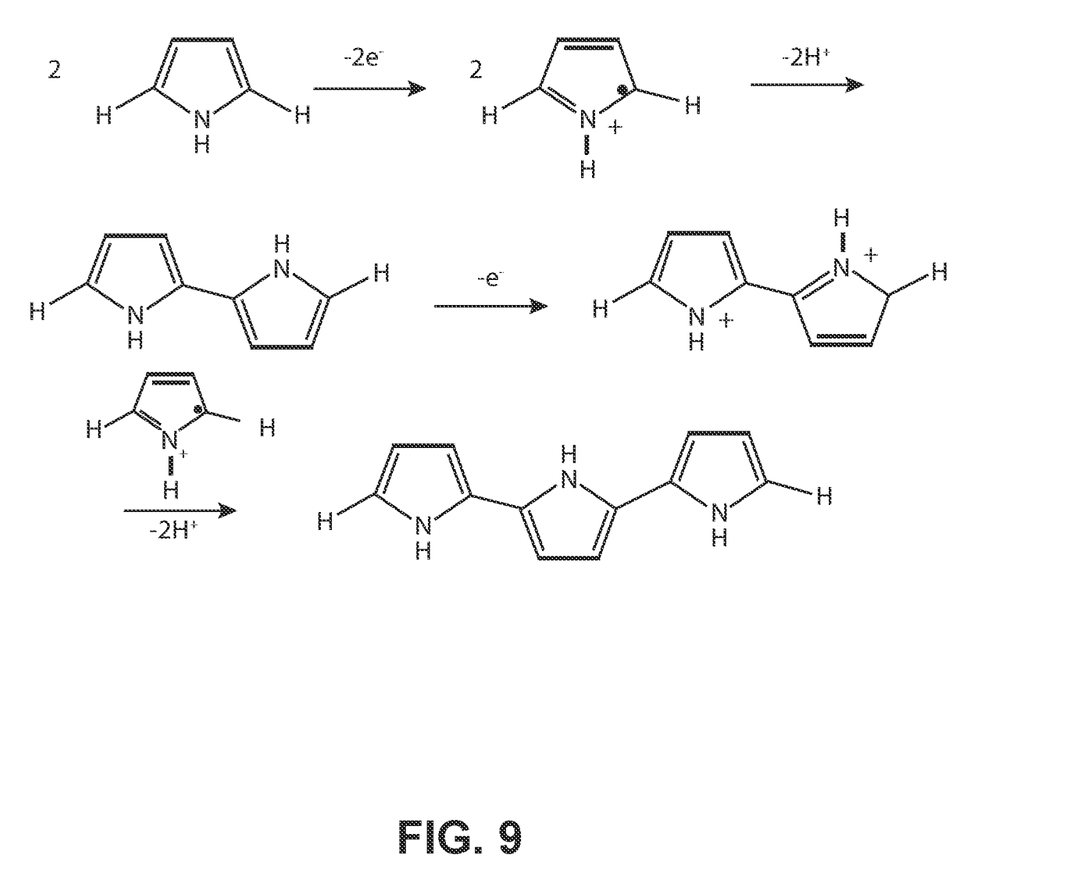
FIG. 9 is a schematic illustration of pyrrole polymerization.

As the process is oxidative to prepare a polymerized pPy conjugated with Fe(III) EDTA - - - Py, there are several electrochemical approaches can be used for the preparation of the metallopolymer, including polymerization under potentiostatic, galvanostatic or potentiodynamic conditions as illustrated in FIG. 9. (Ansari, R., *E-J. Chem*. 2006. 3(13): p. 186-201; incorporated by reference in its entirety). With the potentiostatic method the potential positive is held in the range where polymerization occurs. With the galvanostatic method, the current is controlled and the potential is allowed to vary. Finally, a potentiodynamic method can also be used where the potential is controlled and scanned over a suitable range in order to generate the polymer.

In an exemplary embodiment, the EDTA-Py entity (Na $[H_2(EDTA)]$ - - - Py) is electrochemically polymerized using a three-electrode system in a single compartment cells. This is accomplished by scanning the voltage of the working electrode (e.g., Au) positive and negative of the $E_{1/2}$ of the pyrrole. The pyrrole is thus electropolymerized to form a coating on the working carbon electrode surface. The polymeric film is then treated with iron(III) chloride ($FeCl_3$) to cause iron coordination with EDTA of the polypyrrole film (Na[Fe(EDTA)] - - - PPy). The formation of the conjugate can be summarized as follows, Example 2

Figure 4A:
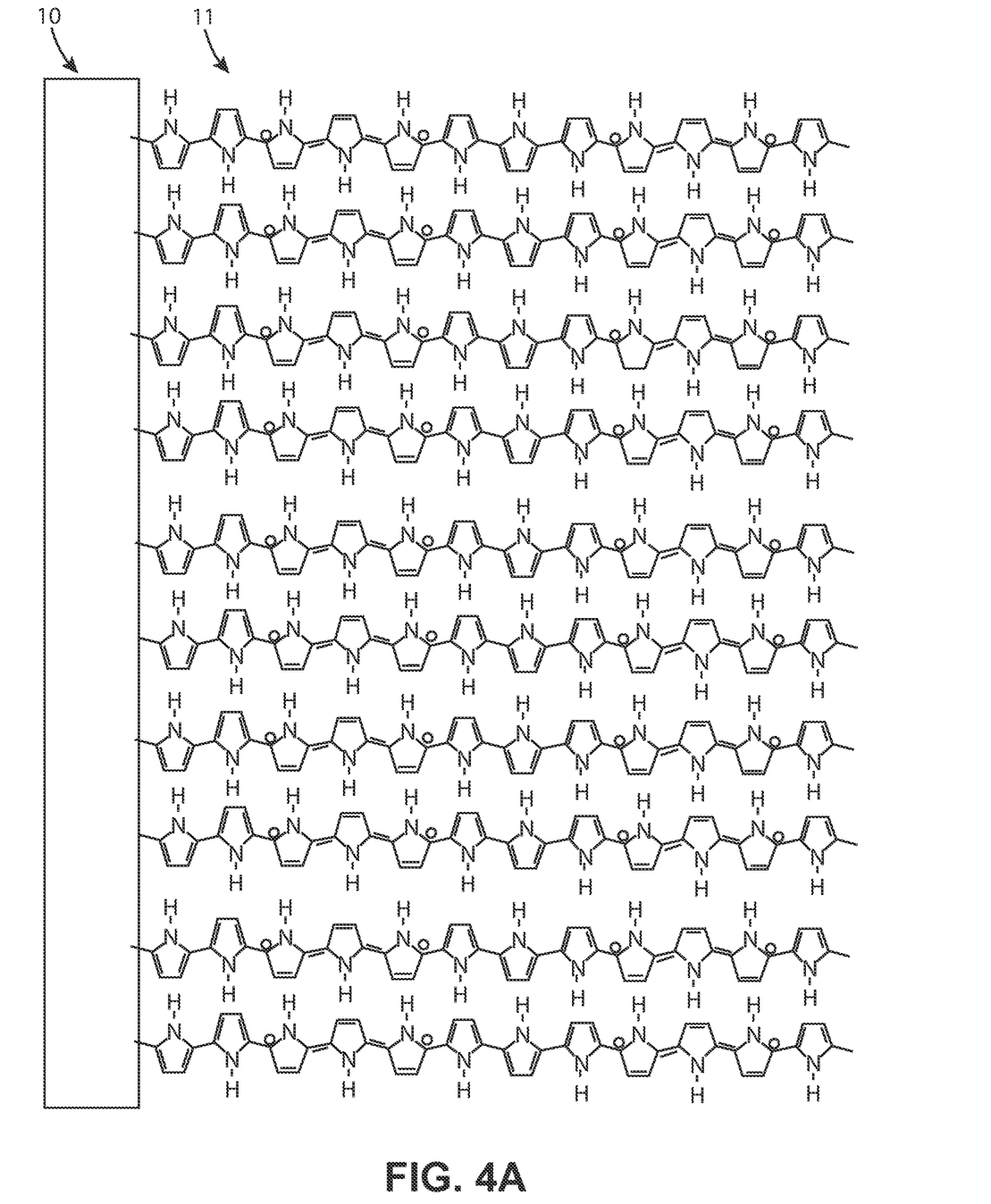
FIG. 4A shows an exemplary embodiment of polymer based electrode made from conductive carbon and electrodeposited film of pPy.
Figure 4B:
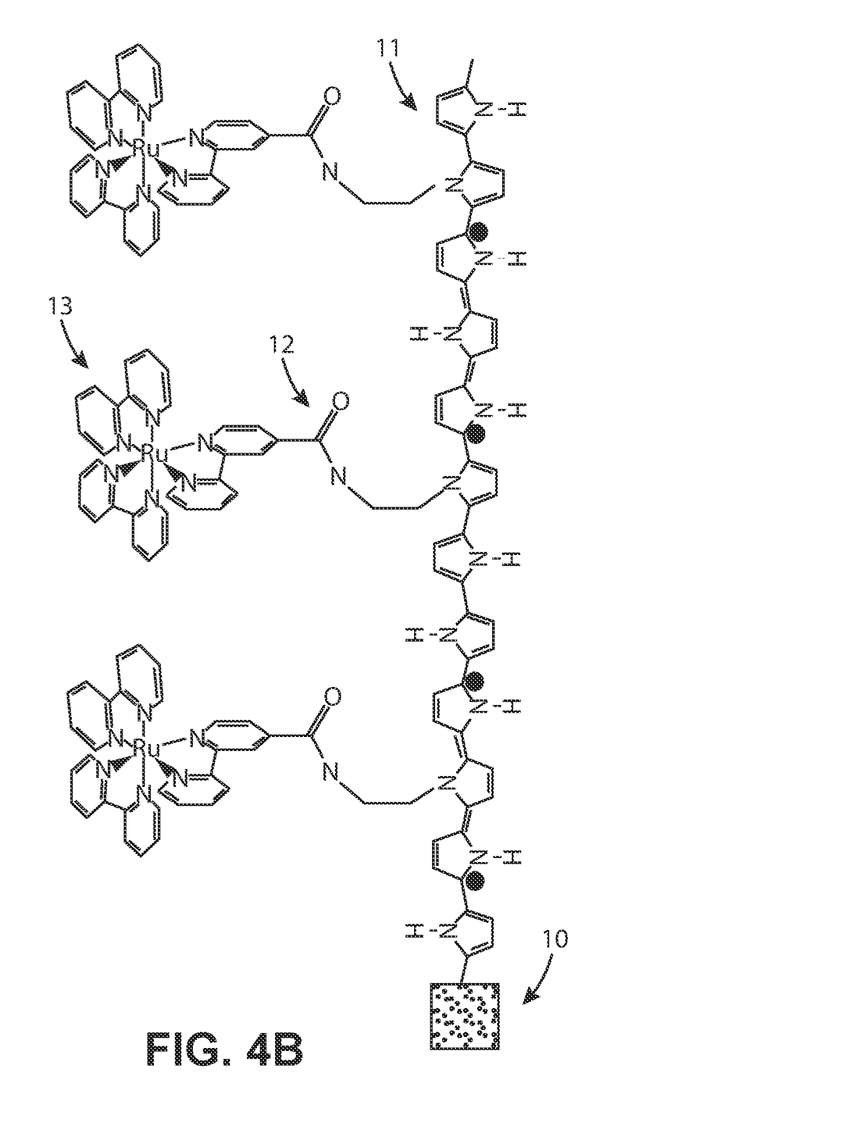
FIG. 4B shows an exemplary embodiment of a single pPy chain of FIG. 4A having covalently linked ruthenium bipyridine complex via ethyl-amide linker to form an electrochemically active conjugate.

In this example, electrochemically active conjugate having poly(bipyridine)ruthenium complex is provided on a conductive carbon surface as illustrated in FIGS. 4A and 4B. A bipyridine in this conjugate has pyrrole substituted on the pyridine ring in the para-position to the nitrogen of the bipyridine ring. The pyrrole is bound by the nitrogen of the pyrrole ring to the pyridine ligand.

Figure 6A:
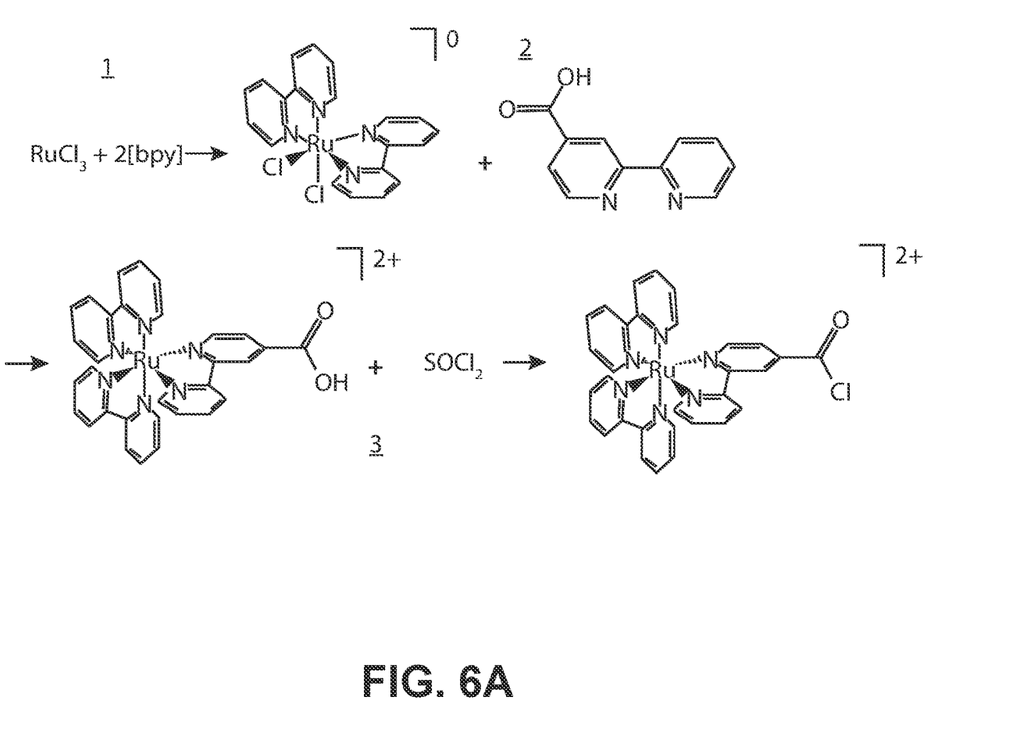
FIG. 6A is a schematic illustration of $Ru[bpy]_2[bpy\text{-}COOH]^{+2}$ and $Ru[bpy]_2[bpyCOCl]^{+2}$ synthesis.

In one specific route shown in FIG. 6A, a series of tris(2,2'-bipyridine)ruthenium(II), $Ru[bpy]_3^{+2}$ complexes are synthesized where one of the bipyridine ligands is substituted with a carboxyl functional group. The synthesis starts with the formation of $Ru[bPy]_2Cl$ by refluxing two unsubstituted bipyridine ligands and ruthenium trichloride ($RuCl_3$) dimethylformamide (DMF) (Step 1). After the first step, the two bipyridine ligands containing no substituents and two remaining chlorides coordinate to the Ru center to initially form ruthenium complex with an octahedral geometry having a coordination number of 6. The third bipyridine ligand is added in a subsequent step using alcohol reflux. Subsequent addition of the bipyridine ligand containing a carboxyl substituent replaces the remaining chlorides with the third bipyridine (Step 2).

Once the ruthenium complex with one carboxyl substituted bipyridine ligand is synthesized, the carboxyl functional group is converted to an acid chloride using thionyl chloride ($SOCl_2$) (Step 3 in FIG. 6A). $SOCl_2$ is convenient for this type of conversion as the $SO_2$ gas formed during the reaction readily vaporizes.

Figure 6B:
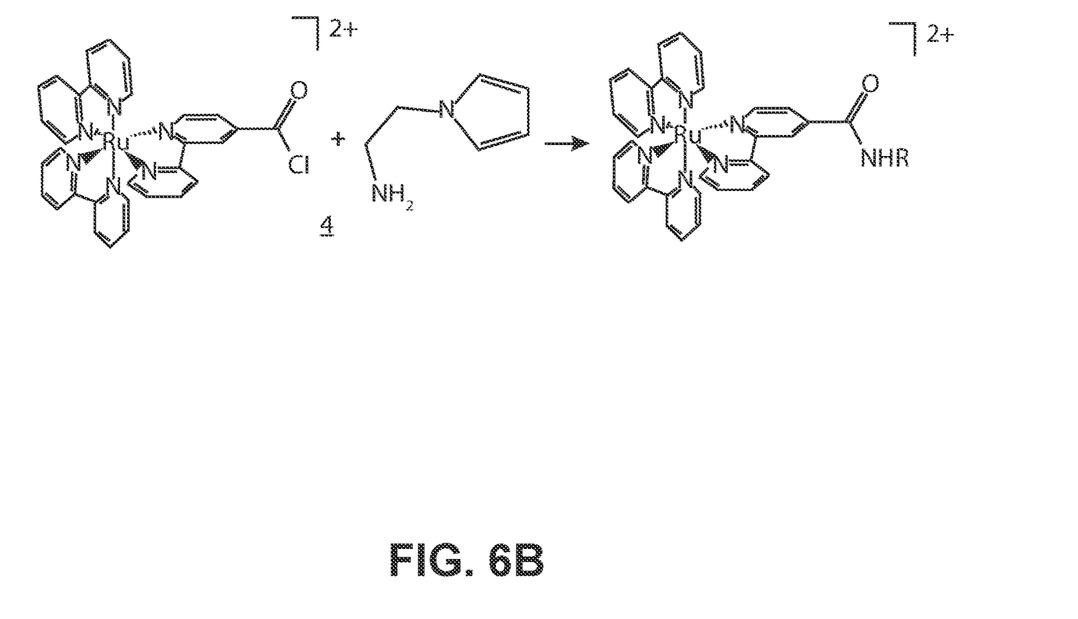
FIG. 6B is a schematic illustration of pyrrole substituted Ru complex synthesis.

The ruthenium complex with one chlorocarbonyl substituted bipyridine is next reacted with 2-cyanoethylpyrrole to form a ruthenium complex with a pyrrole monomer. The 2-cyanoethylpyrrole is treated with a reducing agent, lithium aluminum hydride (LiAlH$_4$), to form 2-aminoethylpyrrole utilizing a procedure reported in Foulds, N. et al. (*Anal. Chem.*, 1988. 60: p. 2473-2478; incorporated by reference in its entirety). The acid chloride substituted bipyridine ruthenium complex, Ru[bpy]$_2$[bpyCOCl]$^{+2}$ is reacted with 2-aminoethylpyrrole to form an amide linkage with the complex leading to a pyrrole substituted ruthenium bipyridine complex as illustrated in FIG. 6B (Step 4).

Ru[bpy]$_2$[bpyCONHR]$^{+2}$ is used as the monomer unit for the subsequent electropolymerization illustrated in FIG. 9. Specifically, after the coordination of the Ru to the bipyridine ligands, the molecular system is dissolved into a solution. Using a three electrode set up with working, auxiliary and reference electrodes the voltage of the working electrode is held at a potential positive of the $E_{1/2}$ of the pyrrole. This oxidation causes electropolymerization of the substituted pyrrole. Excess unsubstituted pyrrole is used in the solution such that unsubstituted pyrrole is also incorporated into the polymer coating.

Example 3 in this example, electrochemically active conjugate having poly(bipyridine)ruthenium complex is provided, as in Example 2 except the Ru metal center is coordinated with two carboxyl substituted bipyridine ligands. Specifically, the ruthenium metal complex is prepared by refluxing two carboxyl substituted bipyridine ligands and RuCl$_3$ in DMF, followed by addition of a third unsubstituted bipyridine ligand by refluxing in alcohol. In this setup, the first two bipyridine ligands containing substituents coordinate to the Ru center to initially form ruthenium complex. Subsequent addition of the third unsubstituted bipyridine ligand replaces the remaining chlorides with bipyridine. It is also within the scope of this disclosure to synthesize ruthenium complex having all three of the bipyridine ligands substituted with carboxyl groups (Ru[bpy-COOH]$_3^{+2}$).

Example 4

In this example, another exemplary electrochemically active conjugate is provided on a conductive carbon surface having metallocene pentadiene complexed to polypyrrole. Specifically, a metallocene (cobalt metal center) is synthesized where one or both of the pentadiene rings is substituted with a carboxylic acid substituent (—COOH). A pyrrole with a substituent in the N-position is used where the substituent is an alkyl group terminating in an amine (—NH$_2$). In this example the alkyl group is an ethyl group.

The substituted metallocene is combined with the substituted pyrrole whereby an amide linkage (—CO—NHR) is formed. This amide group provides the covalent linkage of the metallocene and the pyrrole.

This compound is then placed into solution. The voltage of a working electrode (in conjunction with a reference and auxiliary electrode) is scanned positive and negative of the $E_{1/2}$ of the pyrrole. This results in electropolymerization of the material to form a coating on the electrode.

Example 5

Figure 7:
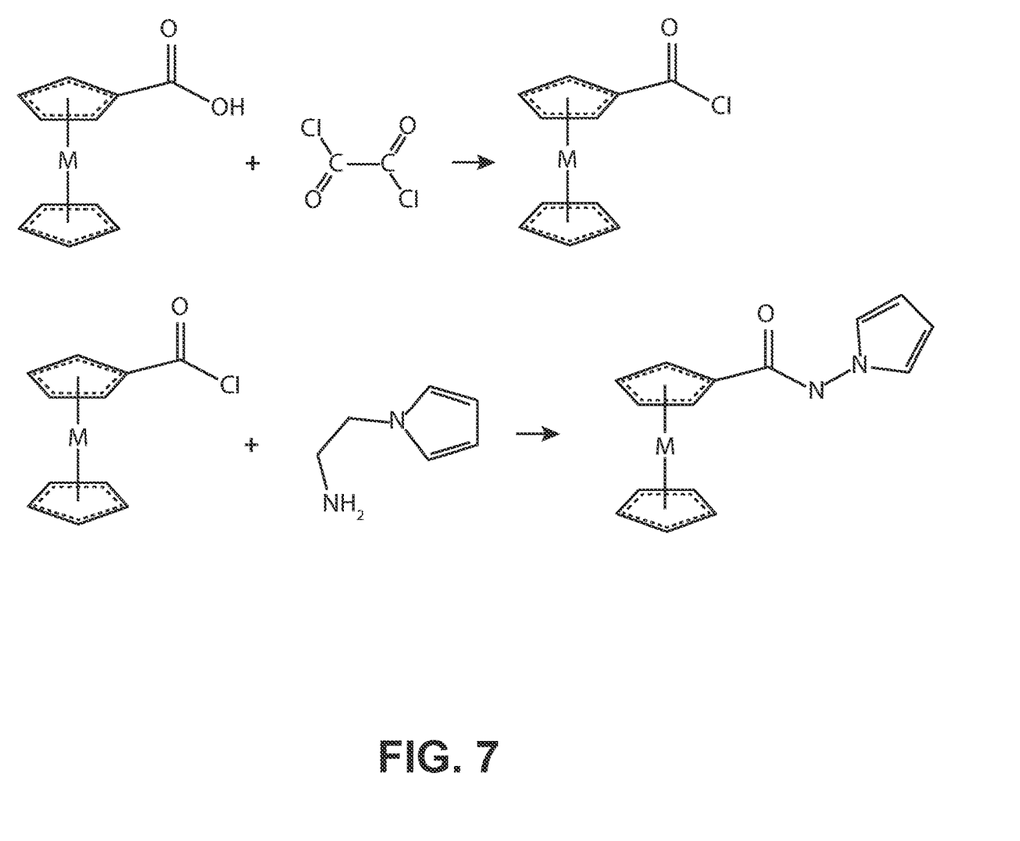
FIG. 7 is a schematic illustration of pyrrole substituted ferrocene synthesis.

In this example, another exemplary electrochemically active conjugate is provided having ferrocene with iron as the metal center complexed to polypyrrole. Specifically, the synthesis starts with ferrocenecarboxylic acid as the starting material. The ferrocenecarboxylic acid is reacted with oxalyl chloride in DMF to provide the ferrocenecarboxylic acid chloride. (Zhu, B. B, et al. *Chem Crystallogr.*, 2012, 42: p. 1-6; incorporated by reference in its entirety). The acid chloride is then reacted with 2-aminoethyl pyrrole to generate the metal containing monomeric unit as illustrated in FIG. 7. Alternatively, ferrocenedicarboxylic acid can be utilized as a starting material where both of the metallocene rings are substituted with a pendant pyrrole unit. This enables the investigation of the impact of crosslinking during the polymerization. This compound is then polymerized in a similar fashion as described in Example 1.

Example 6

Electrodes prepared by electropolymerization as noted above are combined into battery as illustrated in FIG. 5. Specifically, an electrode with a metallocene coating using Co as the central metal is combined with an electrode where a macrocyclic ligand (tetraphenylporphyrin) using Zn as the central metal. The electrodes are separated by a porous membrane such that the two electrodes do not mechanically come in contact with each other. The electrodes and membranes are immersed in an electrolyte where a salt is dissolved in a solvent. In this case, acetonitrile is used as the solvent with an electrolyte (salt) of LiBF$_4$. The configuration as described is then used as a battery.

All publications and patents mentioned in the above specification are incorporated by reference in this specification in their entireties. Various modifications and variations of the described materials and methods will be apparent to those skilled in the art without departing from the scope and spirit of the invention. Although the disclosure has been described in connection with specific preferred embodiments, it should be understood that the invention as claimed should not be unduly limited to such specific embodiments. Indeed, those skilled in the art will recognize, or be able to ascertain using the teaching herein and no more than routine experimentation, many equivalents to the specific embodiments of the invention described herein. Such equivalents are intended to be encompassed by the following claims.

The invention claimed is:

1. A lithium-ion electrochemical storage cell comprising a cathode, an anode, and an electrolyte solution, wherein either the anode, the cathode or both comprise a stable, electrochemically active conjugate, the stable, electrochemically active conjugate comprising:
    a conductive polymer comprising a polypyrrole; and
    an electrochemical moiety covalently linked to the polypyrrole;
    wherein the electrochemical moiety is an electroactive moiety that comprises an electroactive metal center bound to a multidentate ligand; and
    wherein the electroactive metal center consists of ruthenium (Ru) coordinated with at least one bipyridine;
    wherein at least one of the at least one bipyridine is functionalized to form an amide bond with the polypyrrole; and
    wherein the electrochemically active conjugate is Ru[bpy]$_2$[bpyCONH]$^{+2}$ - - - PPy on carbon support to produce charge carriers.

2. The lithium-ion electrochemical storage cell according to claim 1,
    wherein the electrode is attached to the carbon support.

3. The lithium-ion electrochemical storage cell according to claim 2,
wherein the electrode is an anode.

4. The lithium-ion electrochemical storage cell according to claim 1,
wherein the electroactive moiety further includes, a non-metal electroactive organic center that has multiple accessible valence states.

5. The lithium-ion electrochemical storage cell according to claim 4,
wherein the conductive polymer further includes a polymer selected from the group consisting of polyaniline, polyacetylene, polyparaphenylene, polyparaphenylene sulfide, polyparaphenylenevinylene, polythiophene, polyisothionapthene, and combinations thereof.

6. The lithium-ion electrochemical storage cell according to claim 4,
wherein the non-metal electroactive organic center is selected from dialkoxyaryl or trialkoxyaryl.

7. The lithium-ion electrochemical storage cell according to claim 6,
wherein the dialkoxyaryl is 1,2-dimethoxybenzene, 1,3-dimethoxybenzene, or 1,4-dimethoxybenzene.

8. The lithium-ion electrochemical storage cell according to claim 6,
wherein the trialkoxyaryl is 1,2,3-trimethoxybenzene, 1,2,4-trimethoxybenzene, or 1,3,5-trimethoxybenzene.

9. An electrochemical storage cell comprising a cathode, an anode, and an electrolyte solution, wherein the electrochemical cell is a lithium-ion battery, wherein at least the cathode is composed of an electrochemically active conjugate comprising a conductive polymer formed as a polypyrrole, and an electrochemical moiety covalently linked to the polypyrrole, wherein the electrochemical moiety is an electroactive moiety that comprises an electroactive metal center consisting of ruthenium (Ru) coordinated with at least one bipyridine functionalized to form an amide bond with the polypyrrole and bound to a multidentate ligand, and wherein the electrochemically active conjugate is composed of $Ru[bpy]_2[bpyCONH]^{+2}$ - - - PPy] on carbon support to produce charge carriers.

* * * * *